July 18, 1950 W. P. GLASER 2,515,342
MOTION CONVERTING MEANS
Filed Aug. 16, 1946 6 Sheets-Sheet 1

Inventor
WILLIAM P. GLASER
By Randolph & Beavers
Attorneys

July 18, 1950 W. P. GLASER 2,515,342
MOTION CONVERTING MEANS
Filed Aug. 16, 1946 6 Sheets-Sheet 2

Inventor
WILLIAM P. GLASER
By Randolph & Beavers
Attorneys

July 18, 1950 W. P. GLASER 2,515,342
MOTION CONVERTING MEANS
Filed Aug. 16, 1946 6 Sheets-Sheet 3

Inventor
WILLIAM P. GLASER
By Randolph & Beavers
Attorneys

July 18, 1950 W. P. GLASER 2,515,342
MOTION CONVERTING MEANS
Filed Aug. 16, 1946 6 Sheets-Sheet 4

Inventor
WILLIAM P. GLASER
By Randolph & Beavers
Attorneys

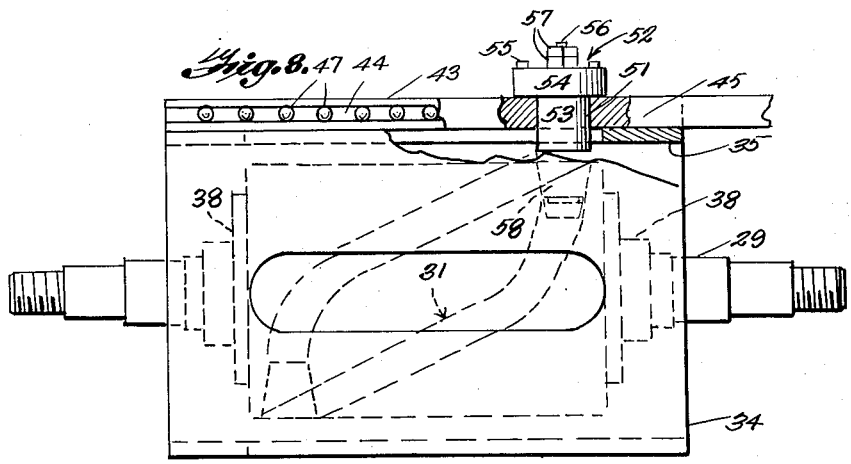
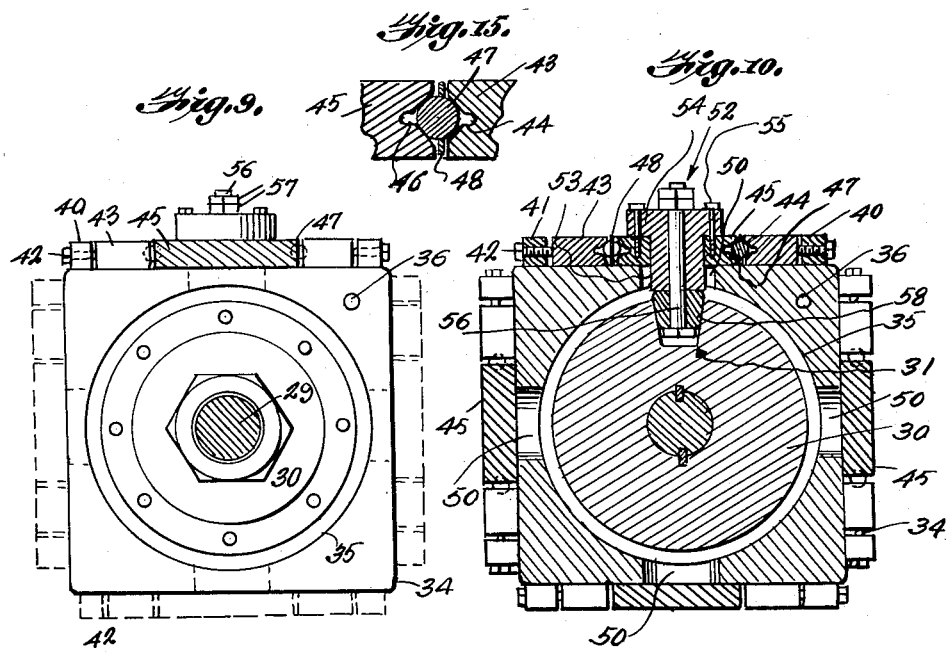
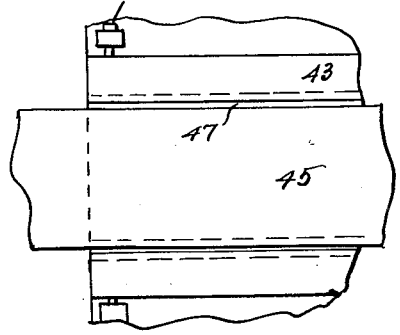

July 18, 1950 W. P. GLASER 2,515,342
MOTION CONVERTING MEANS
Filed Aug. 16, 1946 6 Sheets-Sheet 6
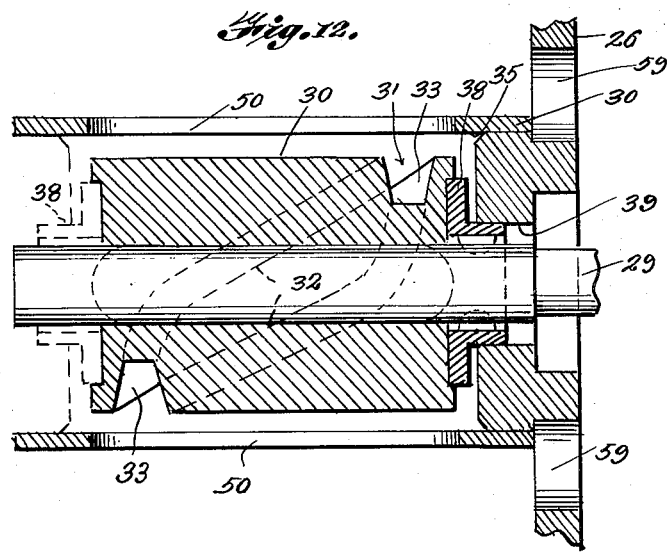
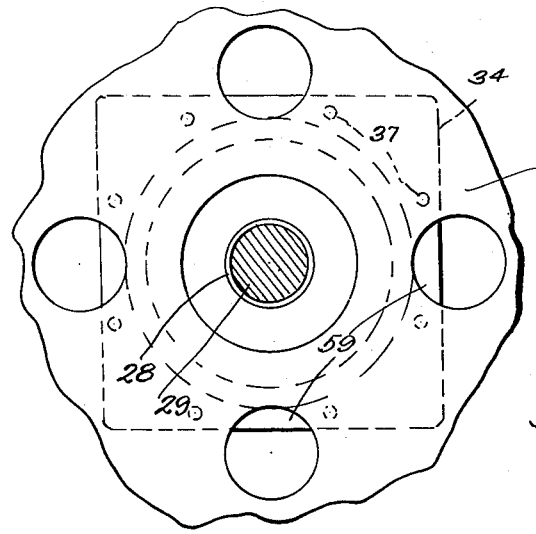
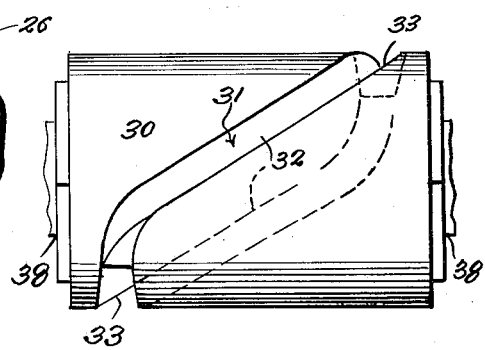
Inventor
WILLIAM P. GLASER
By Randolph & Beavers
Attorneys Patented July 18, 1950

2,515,342

UNITED STATES PATENT OFFICE 2,515,342

MOTION CONVERTING MEANS

William P. Glaser, Waltham, Mass.

Application August 16, 1946, Serial No. 690,961

2 Claims. (Cl. 74—57)

This invention relates to a novel arrangement for driving a rotatable driven shaft from a plurality of reciprocating pistons without the use of cranks or a crankshaft.

It is the primary object of the present invention to provide an engine especially adapted to be embodied in a two cycle oil burning engine, which is equally well adapted for use in other types of engines employing reciprocating pistons.

Another object of the invention is to provide an engine having an endless cam groove to replace the conventional crankshaft and which is driven by the reciprocating pistons and which in turn drives said pistons on the compression strokes thereof.

Another object of the invention is to provide an engine which will reduce to a minimum the friction, torque and stress inherent in all engines, utilizing reciprocating pistons.

Various other objects and advantages of the invention will hereinafter become more fully apparent from the following description of the drawings, which illustrate a preferred embodiment thereof, wherein:

Figure 1 is a fragmentary, side elevational view, partly in longitudinal section and partly broken away, of a portion of an engine constructed in accordance with the invention;

Figures 2 and 3 are cross-sectional views thereof taken substantially along planes indicated by the lines 2—2 and 3—3, respectively, of Figure 1;

Figure 1:
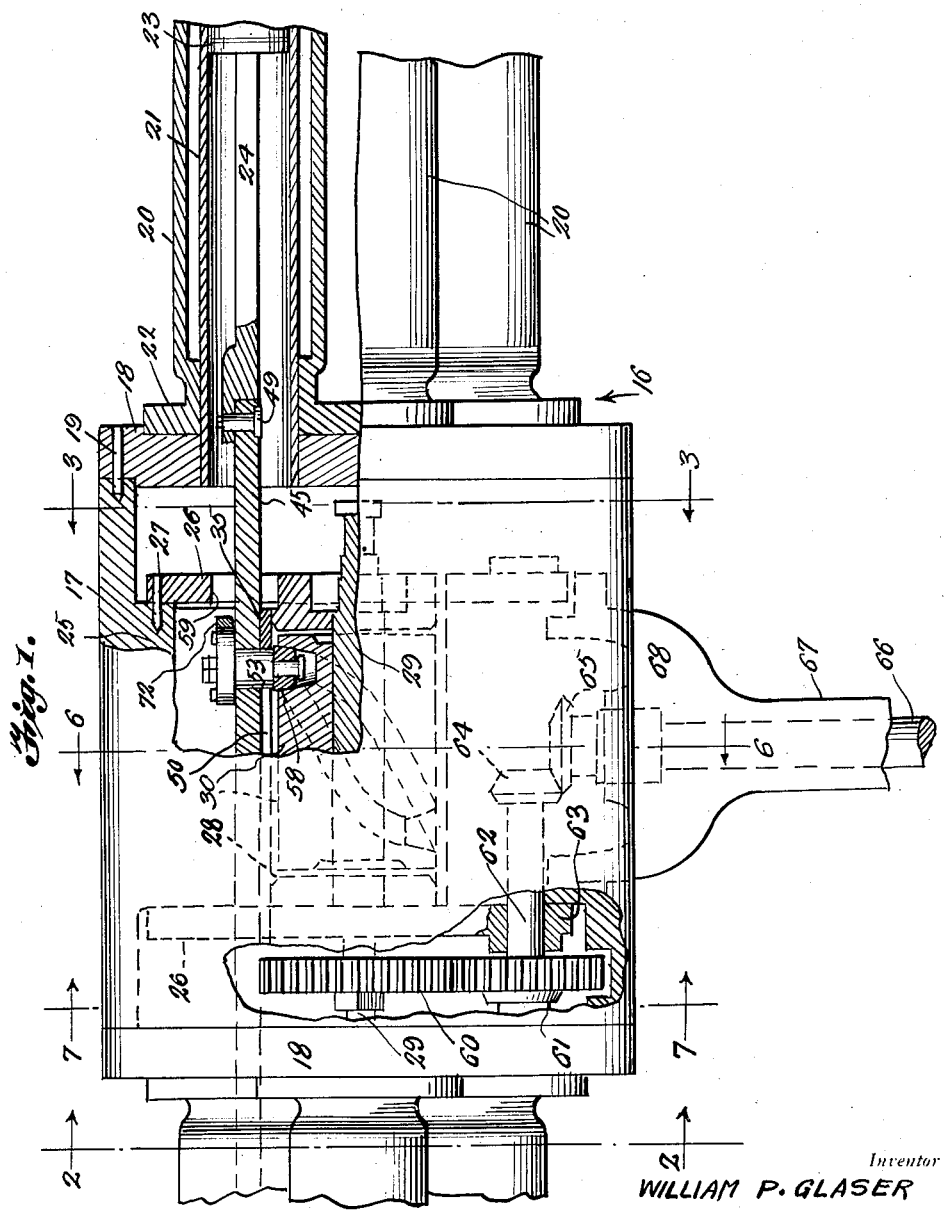
Figure 2:
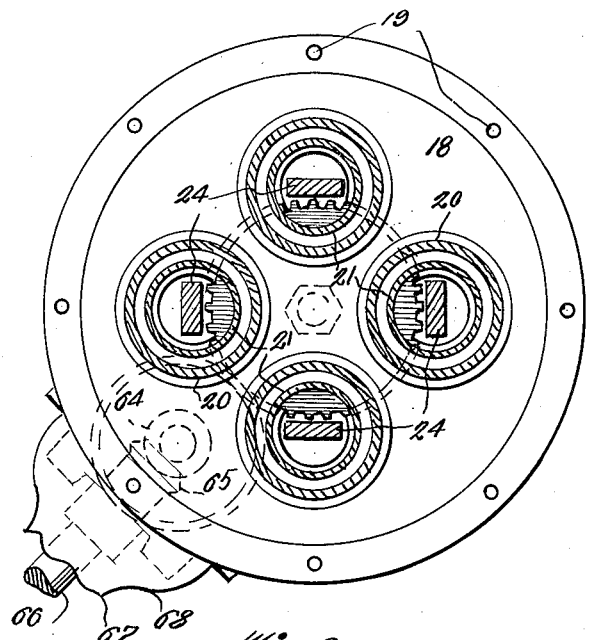
Figure 6:
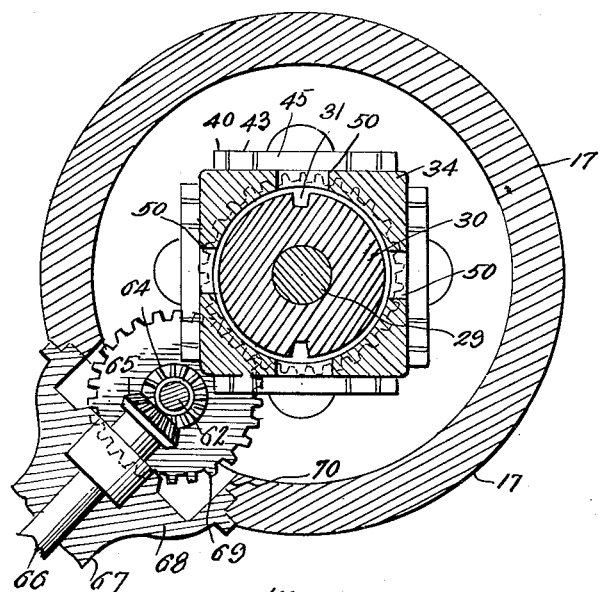
Figure 7:
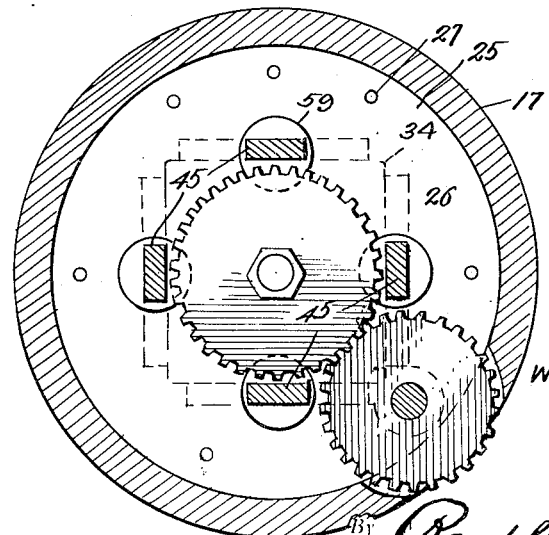

Figures 6 and 7 are cross-sectional views taken substantially along the planes indicated by the lines 6—6 and 7—7, respectively, of Figure 1;

Figure 8 is a side elevational view, partly in section, of certain of the internal parts of the transmission of the engine;

Figure 9 is an end view thereof;

Figure 10 is a cross-sectional view of said transmission parts;

Figure 11 is a fragmentary plan view showing a portion of one of the connecting rod guides;

Figure 12 is a longitudinal, substantially central sectional view of the cam drum and related parts;

Figure 13 is an end view in elevation, looking toward the right-hand end of Figure 12;

Figure 14 is a side elevational view of the cam drum, and

Figure 15 is an enlarged cross-sectional view, showing the antifriction connection between one of the connecting rods and its guide rail.

Referring more specifically to the drawings, the improved engine, designated generally 16, includes a transmission housing 17 having detachable end plates 18 which are definitely located with respect thereto by means of locator pins 19.

Each of the end plates 18 is preferably provided with four cylinders 20, which are secured to and project from the outer side thereof and which are arranged in circumferentially spaced relationship relatively to one another. The cylinders 20 each contain a liner 21 having an inner end suitably secured in an opening 22 of its associated end plate 18, so that the liners 21 open into the housing 17, as illustrated in Figure 1. The cylinders 20 and liners 21 are located by the end plates 18 so that the cylinders and liners of each end plate 18 are in alignment with cylinders and liners 21 and 22, respectively, of the opposite end plate 18. Each of the cylinder liners 21 contains a reciprocally mounted piston 23 having an inwardly extending connecting rod 24.

Figure 3:
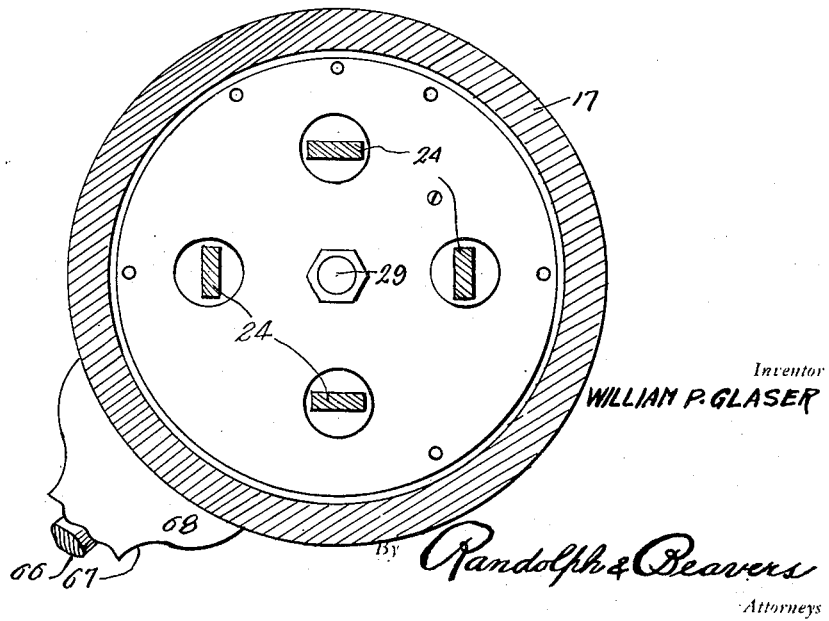
Figure 4:
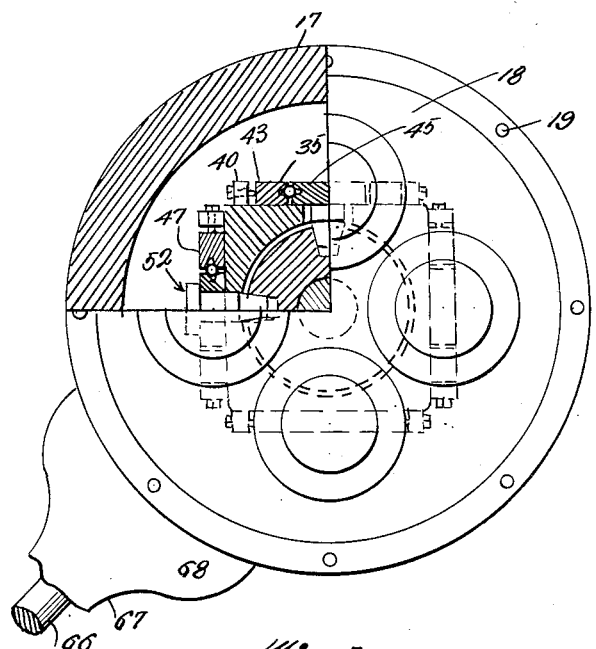
Figure 4 is an end view, partly in cross section thereof.
Figure 5:
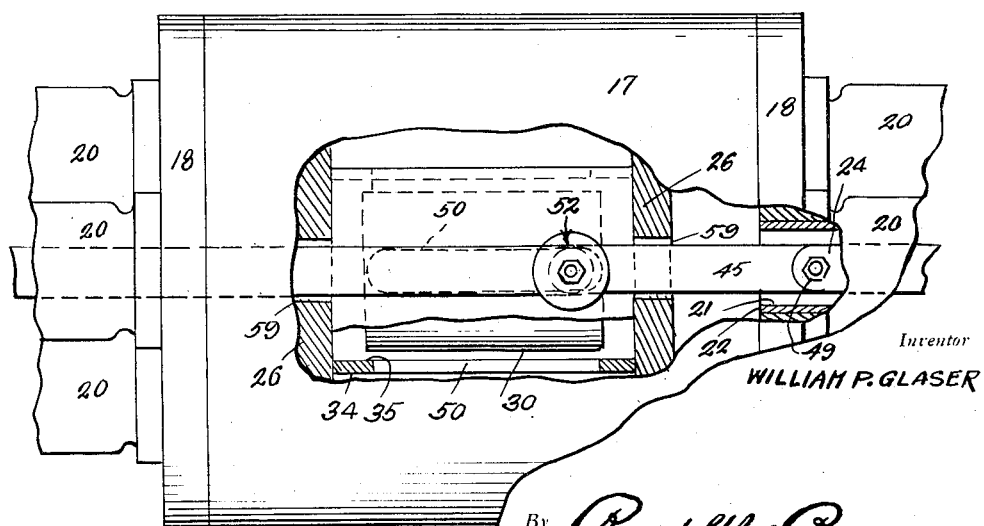
Figure 5 is a fragmentary side elevational view, partly broken away, of the intermediate portion of the engine.

As best seen in Figures 1 and 3, housing 17 is provided with an inwardly projecting circumferentially extending portion 25 which is disposed intermediate of the ends thereof and which provides a support for internal locator plates or discs 26 which are detachably secured to the ends thereof and which are definitely located with respect thereto by locator pins 27. The locator plates 26 are provided with inwardly offset, centrally disposed bearing portions 28 for journaling end portions of a shaft 29, the ends of which project outwardly therethrough. A drum 30, as best seen in Figure 14, is keyed to the intermediate portion of the shaft 29 and between the bearings 28 and is provided with an endless groove 31, including opposite diagonal portions 32, which extend substantially from end to end of the drum 30 and opposite, remotely disposed arcuate end portions 33 which merge with corresponding ends of the diagonal portions 32 to form the endless, undulating groove 31.

The drum 30 is rotatively disposed in a guide block 34 which is rectangular in cross-section, as best seen in Figure 10, and which is provided with a cylindrical bore 35, extending longitudinally therethrough and in which the drum 30 is loosely disposed to rotate with the shaft 29. As seen in Figure 1, the inwardly offset bearing portions 28 extend into the ends of the bore 35 to support the guide block 34 therebetween and the ends of the block 34 are provided with recesses 36 to receive locator pins 37, as seen in Figure 13, which engage therein to definitely position the block 34 with respect to the locator plates 26. As best seen in Figure 12, the shaft 29 is provided with bushing members 38 which are keyed thereto, adjacent the ends of the drum 30, and which engage in the bearing openings 39 of the bearing elements 28.

As best seen in Figures 9 and 10, the block 34 is provided with lugs 40 which project outwardly therefrom at each end and adjacent each corner; said lugs being provided with threaded openings 41 for receiving set screws 42 which extend therethrough and the inner ends of which bear against the outer edges of guide rails 43, two of which are disposed against each side of the block 34 and lengthwise thereof. The guide rails 43 each extend substantially the length of the block 34 and are provided with inwardly opening, substantially V-shaped grooves 44 formed in the inner edges thereof. A connecting bar 45 is slideably disposed between each pair of opposed rails 43 and said connecting bars 45 are provided with V-shaped, longitudinally extending grooves 46 in the side edges thereof and which open into the grooves 44. The opposed grooves 44 and 46 contain antifriction bearing means including a plurality of ball bearings 47 which are contained in an apertured plate or strip 48 which functions to properly space the ball bearings 47 with the individual ball bearings located in individual spaced apertures of the strip or plate 48.

The slide bars 45 are connected at their ends by fastenings 49 to the inner ends of the piston rods 24; each of said rods 45 being connected to the adjacent ends of aligned connecting rods 24. As best seen in Figure 10, the guide block 34 is provided with a longitudinal slot 50 in each side thereof and which opens into the bore 35. The slots 50 are normally covered by the connecting bars 45, each of which is provided with an opening 51, as best seen in Figure 8, for detachably receiving a push pin assembly, designated generally 52, and best illustrated in Figure 10. Each push pin assembly 52 includes a sleeve 53 disposed in the opening 51 and having a headed outer end 54 bearing against the outer side of the connecting bar 45 thereof and detachably secured thereto by fastenings 55. A bolt or headed pin 56 extends longitudinally through the sleeve 53 and is provided with a pair of lock nuts 57 on the outer end thereof, engaging the outer end of the sleeve 53. A tapered roller 58 is journaled on the inner end of the bolt 56, between its head and the inner end of the sleeve 53 and is disposed for movement in the cam groove 31. As seen in Figures 1 and 7, the locator plates 26 are provided with circumferentially spaced openings 59 through which the connecting bars 45 extend and in which said bars are reciprocally disposed.

A gear 60 is keyed to one end of the shaft 29 and meshes with a pinion 61. The gear 60 and pinion 61 are located between one locator plate 26 and the end plate 18 adjacent thereto and the pinion 61 is keyed to the one end of a shaft 62 which is journaled in bearing portion 63 of said locator plate 26, as best seen in Figure 1. The opposite end of the shaft 62 carries a beveled gear 64, which is keyed thereto, and which meshes with a beveled pinion 65 which is keyed to the inner end of a driven shaft 66 which is journaled in a bearing sleeve or housing 67. The inner, bell-shaped end 68 of the housing 67 is fixedly secured in a recessed portion 69 of an opening 70 in the housing 17, in which the inner end of the shaft 66 and the beveled pinion 65 are disposed. The driven shaft 66 is adapted to be connected to the driven axle of a vehicle on which the engine 16 is mounted or to any other means, not shown, which is adapted to be actuated by the engine 16. Likewise, suitable means for varying the driving ratio between the shaft 29 and the part or parts driven by the shaft 66 may be provided.

As illustrated in the drawings and as previously described, each of the end plates 18 supports four pistons and cylinders and the aligned pistons are connected by connecting bars 45. Each of the four connecting bars 45 is provided with a push pin assembly 52 which engages the groove 31 so that the drum 30 will be revolved in the direction as indicated by the arrows 71 in Figure 3 or in a clockwise direction, looking from right to left of Figure 1. Suitable means is provided in the remote ends of the cylinders 20 or liners 21 for admitting an explosive charge thereto, for igniting the explosive charge and for exhausting the products of combustion therefrom, as the said pistons 23 move toward the housing 17 on their power strokes and away from the housing 17 on their compression strokes. Likewise, it will be readily apparent that when one of a pair of pistons 23 is moving toward the housing 17 on its power stroke for rotating the cam drum 30, the other aligned piston 23 will be moving in the opposite direction on its compression stroke. It will likewise be readily apparent that the pistons 23 will be disposed at different points of movement with respect to their cylinders and liners so that certain of the pistons will be commencing their power strokes as other of the pistons are at midpoints of their power strokes or completing their power strokes or beginning, completing or at midpoints of their compression strokes. It will thus be readily apparent that a plurality of pistons 23 are at all times actively functioning to revolve the cam drum 30 which in turn revolves the shaft 29 for rotating the driven shaft 66 through the gears 60, pinions 61, intermediate shafts 62, beveled gears 64 and beveled pinion 65.

The engine 16 is preferably provided with a lever 72, as seen in Figure 1, which is engaged by one of the push rod units 52 and which may be utilized to actuate suitable mechanism, not shown, for regulating the timing of the ignition system of the engine 16, as well as the valve means for admitting the fuel charges to the cylinders and for releasing the exhaust gases therefrom. The cylindrical housing portion 17 is preferably provided with openings through which the push rod unit 52 may be removed and replaced without otherwise disassembling the machine 16.

It will be readily apparent that one group of the cylinders 20, liners 21, and pistons 23, attached to one of the end plates 18, could be dispensed with and the other cylinders and pistons could then be made of the double acting type to operate on a power stroke in each direction. Suitable clutch means, not shown, could then be mounted on the end plate 18 not utilized for supporting the cylinders and pistons, to thus eliminate all complicated gear drives.

Various other modifications and changes are likewise contemplated and may obviously be resorted to, without departing from the spirit and scope of the invention, as hereinafter defined by the appended claims.

I claim:

1. In an engine of the reciprocating piston type, a plurality of cylinders disposed in spaced apart, longitudinally aligned relationship, pistons reciprocally disposed in said cylinders, connecting bars connecting the pistons of aligned cylinders and extending therebetween, a cam drum rotatively disposed between the adjacent ends of said cylinders, a guide block in which the cam drum is rotatively mounted, said connecting bars slideably engaging the sides of the guide block, said guide block having longitudinal slots in communication with said cam drum and over which said connecting bars are reciprocally disposed, said cam drum being provided with an endless undulating came groove, push pins mounted on said connecting bars and extending through said slots for slideably engaging the cam groove for rotating the cam drum when the connecting bars are reciprocated by the movement of said pistons, a housing enclosing said cam drum and guide block, locator plates detachably mounted in said housing and provided with bearings for journaling the cam drum shaft and having inwardly extending projections extending into the ends of the guide block for supporting the guide block and cam drum within said housing.

2. In an engine provided with reciprocating pistons, a housing having an end wall provided with a plurality of cylinders projecting outwardly therefrom and opening into said housing, pistons reciprocally disposed in said cylinders, a guide block detachably supported in said housing and provided with a central bore extending therethrough and a plurality of longitudinal slots communicating with said bore and opening outwardly thereof, a cam drum rotatively mounted in said guide block bore and provided with an endless undulating cam groove, connecting rods projecting from said pistons and slideably engaging the outer sides of the guide block and disposed over the longitudinal slots thereof, a push rod extending laterally through each connecting rod and slideably disposed in the slot over which its connecting rod is disposed for slideably engaging the cam groove, and a shaft keyed to said cam drum and rotated thereby when the cam drum is revolved by a reciprocation of the pistons and the connecting rods, locator plates detachably mounted in the housing for detachably supporting the guide block and for journaling said shaft, a driven shaft having one end journaled in the housing and disposed at a right angle to the first mentioned shaft, and driving means disposed in the housing and connecting the shafts.

WILLIAM P. GLASER.

REFERENCES CITED

The following references are of record in the file of this patent:

UNITED STATES PATENTS

| Number | Name | Date |
|---|---|---|
| 1,261,111 | Fasey et al. | Apr. 2, 1918 |
| 1,736,507 | Peterson | Nov. 19, 1929 |
| 2,216,990 | Taylor | Oct. 8, 1940 |
| 2,256,601 | West | Sept. 23, 1941 |